INVENTOR
EDWARD ZYCHAL
BY *Martin L. Faigus*
AGENT

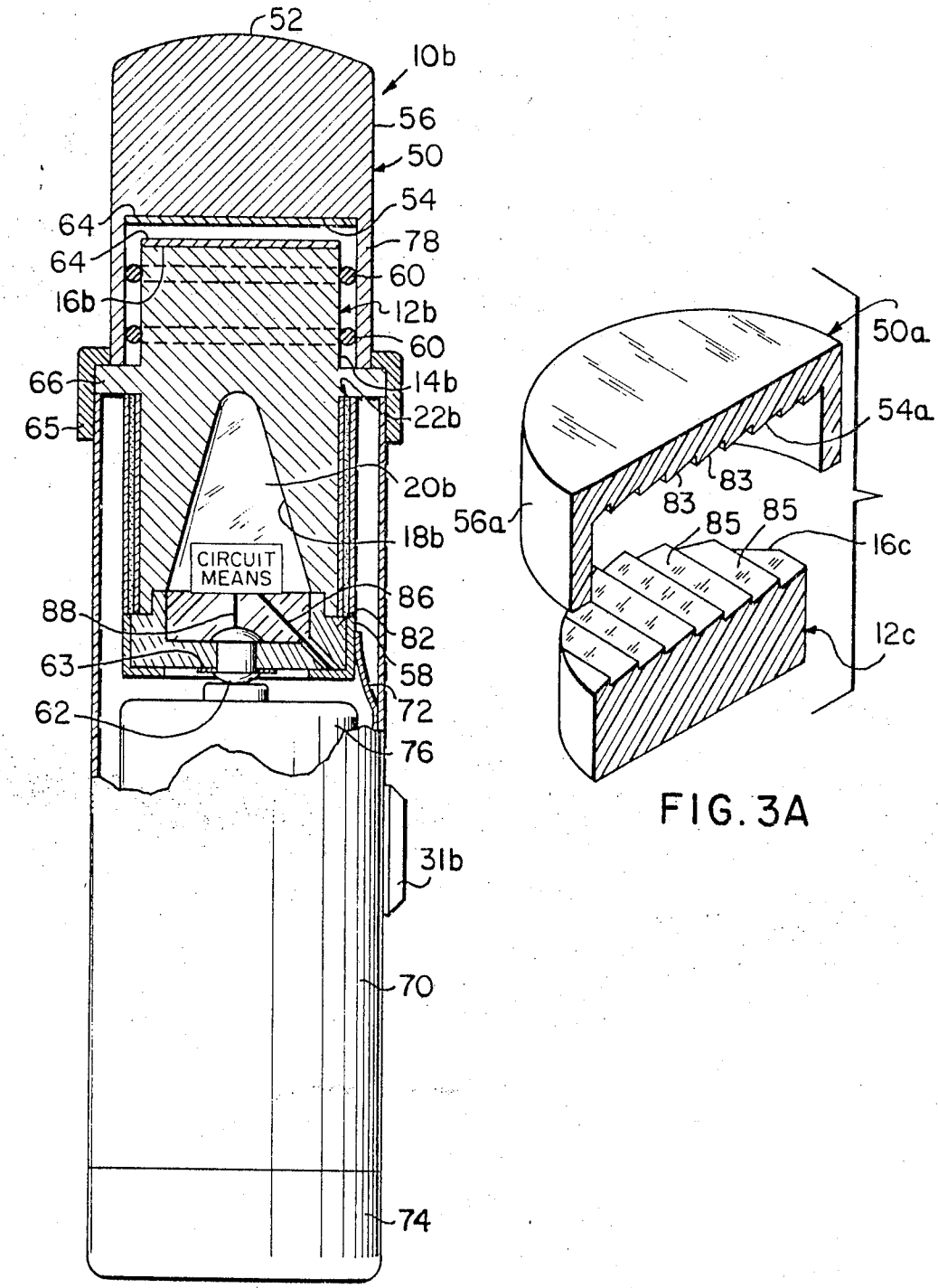

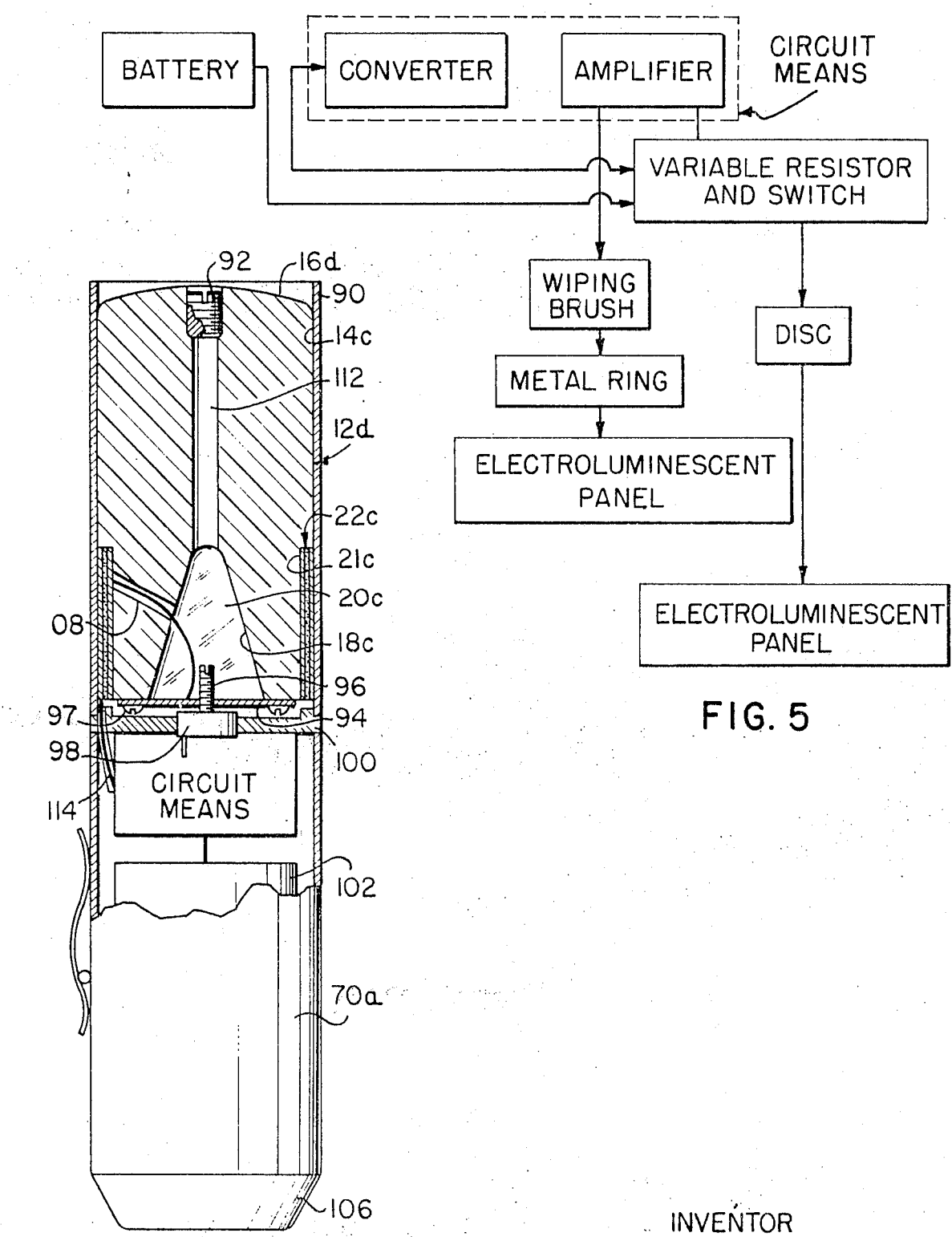

United States Patent Office 3,539,796
Patented Nov. 10, 1970

3,539,796
ELECTROLUMINESCENT LIGHTING UNITS
Edward Zychal, Cornwells Heights, Pa., assignor to Elco Corporation, Willow Grove, Pa., a corporation of Delaware
Filed Jan. 11, 1968, Ser. No. 697,124
Int. Cl. F21l 7/00
U.S. Cl. 240—10.6
7 Claims

ABSTRACT OF THE DISCLOSURE

An electroluminescent lighting unit provides concentrated light by means of a light transmitting rod having a rearward portion comprised of a reflecting surface and a forward portion comprised of a light emitting face. An electroluminescent panel is positioned about the outer periphery of the rod adjacent said reflecting surface, and the reflecting surface reflects incident light emitted from the electroluminescent panel through the light transmitting rod and out the emitting face at the forward portion of the rod.

---

This invention relates generally to lighting units, and more particularly to lighting units which utilize an electroluminescent panel as the light generating source.

The electroluminescent panel utilized in the devices of this invention is comprised of an electroluminescent phosphor which is sandwiched between two conductive layers. Upon application of an A.C. voltage to the conductive layers, the phosphor is excited and luminesces. At least one of said conductive layers is transparent, which permits radiant energy emission from said phosphor to pass through said conductive layer. For further details of construction relating to electroluminescent panels see Pat. Nos. 3,153,745, issued to Gurian et al.; 3,056,031, issued to McNaney; and 2,975,318, issued to Nicoll. The subject matter of the above patents is incorporated into this application by reference.

Electroluminescent lighting units have several advantages over lighting units which utilize an incandescent lamp as the light generating source. Electroluminescent lighting units require less power input for a given light output than do lighting units which utilize an incandescent lamp; therefore a power supply for electroluminescent lighting unit may be made smaller and usually will last longer than if such power supply were used for incandescent lighting units. Electroluminescent lighting units are more rugged than incandescent lighting units and therefore can withstand rough usage with less chance of failure than incandescent lighting units.

An electroluminescent panel emits multidirectional, low intensity low brightness radiant energy and therefore, cannot be utilized by itself as an illumination light for night vision. There has been much interest in developing electroluminescent devices in which the radiant energy output from an electroluminescent panel is directionalized and the brightness of such radiant energy output is increased so that they can be utilized in night vision applications. One such approach has been to utilize an electroluminescent panel in combination with a photoluminescent plastic elongated member having a rectangular cross section, such that the electroluminescent panel excites a long side of said member and the radiant energy emitted from a short side of said member is utilized. This approach has been utilized by Motson (Pat. No. 3,065,369) and Nicoll (Pat. No. 2,975,318).

The devices of the present invention embody novel and unobvious means for providing utilizable radiant energy emission which is brighter than that emitted from the electroluminescent panel, which is unidirectional, and which can, therefore, be focused on the precise area to be viewed. The present invention employs light piping techniques in conjunction with an electroluminescent panel, which serves as the light generating source.

The devices of the present invention employ a light transmitting rod made from an acrylic, such as Lucite or Plexiglas, said light transmitting rod having a rearward portion which is comprised of a reflecting surface, which may be a diffuse surface or a mirror surface, and a forward portion having a light emitting face associated therewith. An electroluminescent panel is positioned about the outer periphery of the rod adjacent to the reflecting surface, and the reflecting surface directs (by total internal reflection) the light emitted from the electroluminescent panel through the rod and out the light emitting face. The electroluminescent panel is positioned about the outer periphery of the light transmitting rod, with the transparent conductive layer of said electroluminescent panel is in contact with the outer periphery of said rod to permit the radiant energy emission from said panel to pass through said panel and be reflected from said reflecting surface. The reflecting surface is shaped so that most of the light radiation which strikes said surface will be reflected at an angle to the periphery of the rod, which is greater than the critical angle for total internal reflection through said rod. Therefore, most of the light which is reflected from the reflecting surface will be totally internally reflected through the rod and out the light emitting face of said rod. By positioning the electroluminescent panel about the outer periphery of the rod a large light emitting area of said panel can be positioned adjacent to said reflecting surface.

By utilizing a light transmitting rod which has a light emitting face having a smaller area than the area of the light emitting surface of the electroluminescent panel, the light emitted through said emitting face will have a greater brightness per unit area than that emitted from the electroluminescent panel. The increase in brightness can also be effected by providing an emitting face which is configured to act as a lens for focusing the radiant energy emitted from the panel over a smaller area than of the light emitting surface of the electroluminescent panel. Also, a separate lens system can be utilized in conjunction with the light transmitting rod to focus the radiant energy which is emitted through the emitting face of said rod.

The preferred embodiments of the devices of this invention are provided with an opaque covering over the outer periphery of the light transmitting rod to prevent the light rays which are refracted through said periphery from being observable. Therefore, the only light which is utilized in such devices is that which is emitted through the emitting face at the forward portion of said rod. This arrangement is particularly important for applications in which highly directionalized minimum area light emission is necessary or desirable.

DRAWINGS

FIG. 3 shows a flashlight, with parts removed, employing a third embodiment of an electroluminescent lighting unit in the form of a module. Certain parts are shown broken away, and other parts are shown in section, to show details of construction of the module.

FIG. 3A shows a modification of the module of FIG. 3.

FIG. 4 shows a fourth embodiment of the invention in which the lighting unit is in the form of a miniature flashlight unit. Parts are broken away, and other parts are shown in section, to show details of construction.

FIG. 5 shows, in schematic form, the circuit arrangement utilized in the lighting unit of FIG. 4.

FIG. 1

Figure 1:
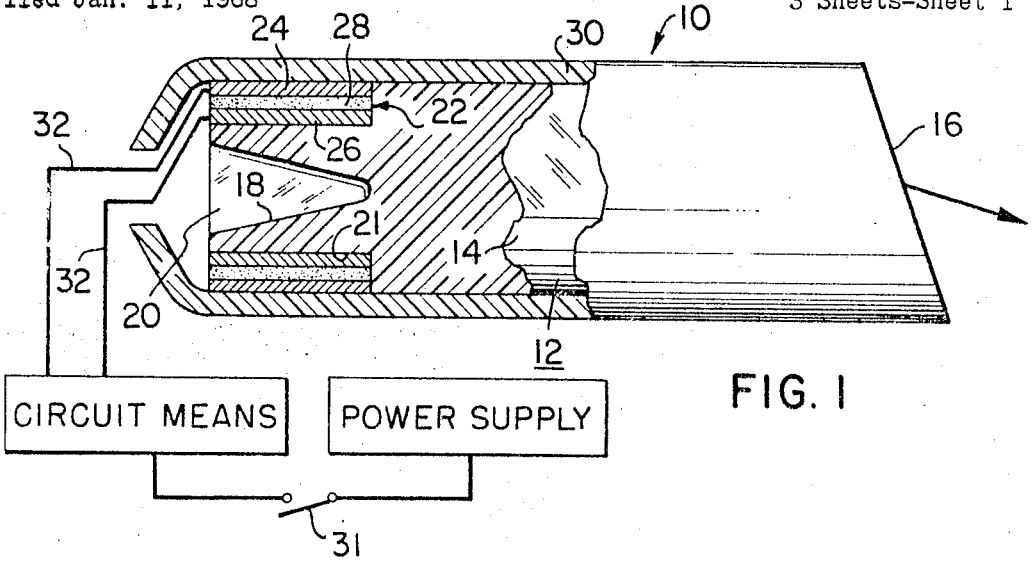
FIG. 1 shows a first embodiment of an electroluminescent lighting unit with parts broken away to show details of construction.

A first embodiment of an electroluminescent light unit 10 is shown in FIG. 1. The unit is comprised of a polished acrylic light transmitting rod 12, such as Lucite or Plexiglas. The rod 12 has an outer periphery 14 with a reduced portion 21 at the rearward portion of said rod. The forward portion of said rod 12 has a forward face 16, which in the embodiment shown in FIG. 1, is a flat face which is angularly disposed with respect to the longitudinal axis of the rod 12, and constitutes the light emitting surface of the unit 10. The rearward portion of the rod 12 has a diffuse reflecting surface 18 converging toward the forward portion of rod 12 and defining a conical cavity 20. The reflecting surface 18 can be machine finished to provide a roughened surface which is frosted in appearance, or alternatively, can be provided with a smooth surface coated with a material, such as white paint.

The reduced portion 21 of the outer periphery 14 of light transmitting rod 12, accommodates a wrap of electroluminescent panel 22. The electroluminescent panel 22 is comprised of an electroluminescent phosphor 28 sandwiched between two conductive layers 24 and 26. The conductive layer 26 is transparent and the panel is wrapped about the reduced portion 21 of the outer periphery 14 of the light transmitting rod 12 with the transparent conductive layer 26 facing said reduced portion 21.

The outer periphery 14 of the light transmitting rod 12, and the electroluminescent panel 22, are covered by a black, flat finish plastic tubing 30. The plastic tubing 30 can be a heat shrinkable, polyvinylchloride plastic tube which is positioned about the light transmitting rod 12, and then heated to cause said tubing to shrink, and thus provide firm contact between said tubing 30 and said rod 12.

Leads 32 connect the conductive layers 24 and 26 to suitable circuit means which converts low D.C. voltage (approximately 4.8 volts) from a power supply to high A.C. voltage (approximately 100–500 volts) for energizing the electroluminescent panel to cause the phosphor 28 to luminesce. The circuit means is comprised of a standard transistor oscillator circuit for converting low D.C. voltage to low A.C. voltage, and an amplifier, such as transformer, for increasing the A.C. voltage to a value which is capable of energizing the electroluminescent panel 22 to cause the phosphor 28 to luminesce. A variable resistor may optionally be included in the circuitry to vary the voltage applied to panel 22, and thereby vary the intensity of the radiant energy emission from said panel.

The lighting unit, circuit means and power supply can be assembled as a single unit or as separate units, depending on the desired application for the device.

The lighting unit 10 operates in the following manner: Switch 31 is closed to complete the circuit between the power supply (which in the preferred embodiment is a 4.8 volt D.C. battery) and the circuit means. The circuit means converts the low voltage D.C. output from the power supply to a high voltage A.C. output for energizing the electroluminescent panel. A variable resistor may be included in the circuitry to vary the A.C. voltage output from approximately 100 volts to approximately 500 volts. The frequency ranges from 400 to 1000 cycles per second depending upon the load. Upon being energized, the electroluminescent phosphor 28 of the electroluminescent panel 22 luminesces, emitting radiant energy in the visible range. The radiant energy strikes the reflecting surface 18 and is reflected toward the forward portion of the light transmitting rod 12. The light rays which are reflected at an angle which is less than the critical angle for total internal reflection, are refracted at the outer periphery of rod 12 and absorbed by the plastic tubing 30. Therefore the only usable radiant energy is that which is emitted through forward face 16 of the light transmitting rod 12. The power consumption of this device is approximately 0.144 watt (.030 amp at 4.8 volts).

Many modifications can be made within the purview of this invention. For example, the forward face 16 can be a flat, polished surface which lies in a plane that is perpendicular to the longitudinal axis of the light transmitting rod, or said face 16 can be a polished convex surface for focusing light emitted through said surface over a smaller area than that of the light emitting surface of the electroluminescent panel. Also, the forward face 16 of said rod can be covered by a black, flat finish plastic tubing, or other suitable material, and a portion of the periphery 14 at the forward portion of the rod 12 can be exposed to provide the light emitting surface. In this arrangement the forward face 16 will be angularly disposed with respect to the longitudinal axis of the rod 12, to reflect incident rays through the exposed emitting surface on the periphery 14 of said rod 12.

Although, in the preferred embodiment of the device a polyvinylchloride flat finished, heat shrinkable plastic tubing is utilized to cover the lighting unit 10, other materials can be utilized for this purpose. For example, for some applications a flat finish acrylic lacquer or black tape can be utilized to coat the unit. As an alternative to, or in addition to, utilizing the plastic tubing to mechanically hold the electroluminescent panel 22 to the light transmitting rod 12, a tap means can be wrapped around the electroluminescent panel, or one of the leads from the conductive layers 24 or 26 of said panel 22 can be wrapped about the panel.

FIG. 2

Figure 2:
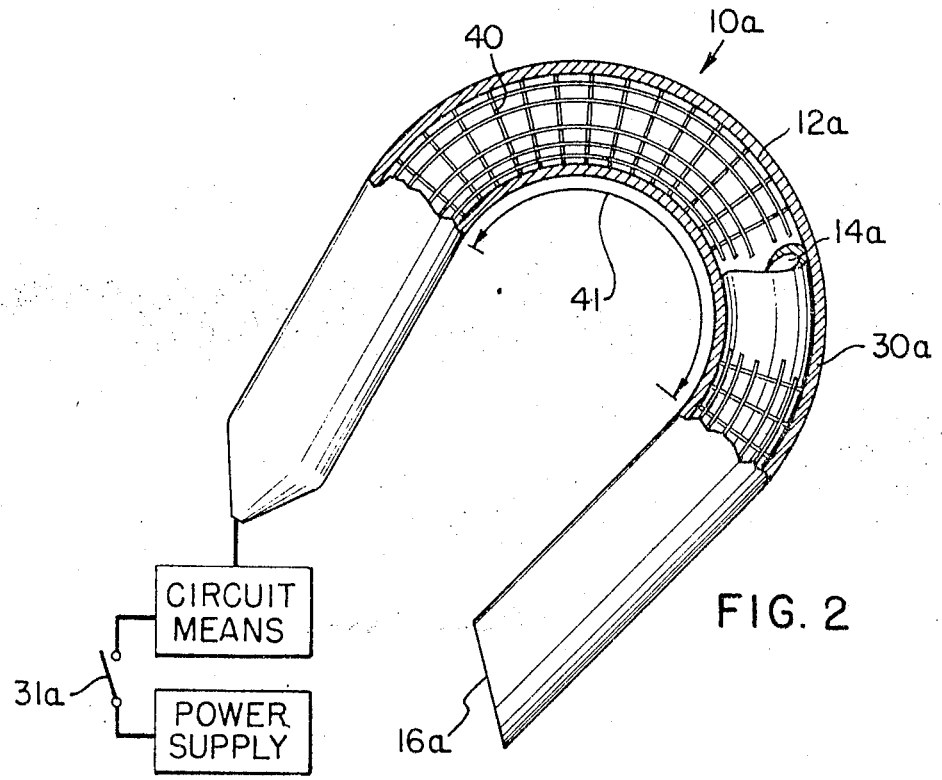
FIG. 2 shows a second embodiment of an electroluminescent lighting unit with parts broken away to show details of construction.

FIG. 2 shows a second embodiment of an electroluminescent lighting unit 10a, in which the elements corresponding to the elements of the device disclosed in FIG. 1 are desigated by the same numerals with an a suffix thereafter. The electroluminescent lighting unit 10a disclosed in FIG. 2 has a substantially U-shaped portion 41 separating the rearward portion of rod 12a from the forward portion of said rod 12a, and a plastic screen 40 (for example, Saran screen) is wrapped about said rod, between said rod and the plastic tubing 30a, at least in the region of the U-shaped bend. Except for the U-shaped portion 41, and the plastic screen 40, the unit disclosed in FIG. 2 is substantially the same as the unit disclosed in FIG. 1.

When the plastic tubing 30a is in direct contact with a substantial portion of the periphery 14a of the rod 12a in the region of the U-shaped bend, the light emitted from the electroluminescent panel is not able to negotiate the bent portion 41 and be emitted through forward face 16a of the rod 12a. However, by separating a substantial portion of the plastic tubing 30a from the rod 12a in the region of the bend, a substantial portion of the radiant energy emitted from the electroluminescent panel is reflected through the rod 12a and out forward face 16a of said rod. The precise reason for this occurrence is not completely understood, but it is believed that the critical angle for total internal reflection at the rod-tubing interface is greater than the critical angle at the rod-air interface. It is believed that relatively few, if any rays, will strike the periphery 14a of rod 12a in the region of the bend, at an angle which is greater than the critical angle for total internal reflection of the rod-tubing interface. Therefore, when the tubing 30a is in direct contact with the periphery of rod 12a in the region of the bend, thus providing a rod-tubing interface in said region, light rays impinging on said interface will be refracted through rod 12a and absorbed by the tubing 30a. However, by utilizing a plastic screen 40 to separate the plastic tubing 30a from the periphery of the rod 12a in the region of the bend, a substantial portion of the interface in the region of the bend is a rod-air interface, which has a smaller critical angle for total internal reflection, than does the rod-tubing interface. A substantial portion of the rays emanating from the electroluminescent panel impinge upon the interface in the region of the bend at an angle which is greater than the critical angle of the rod-air interface. Therefore, these rays will be totally internally reflected within the rod 12a around the bent portion 41, and out forward face 16a.

The mode of operation of this device is the same as that disclosed in FIG. 1.

The emitting face can assume the many configurations referred to with respect to the device disclosed in FIG. 1. Also, the covering from the rod 12a can be a material other than a polyvinylchloride, heat shrinkable plastic tubing. For example, a black tape, or other material capable of shielding the outer periphery of the rod can be utilized.

FIG. 3

FIG. 3 discloses a third embodiment of a lighting unit 10b which elements corresponding to the elements of the device disclosed in FIG. 1, are designated by the same numerals with a b suffix thereafter. The device disclosed in FIG. 3 is in the form of a module which is adapted to be utilized in a standard flashlight; for example, the "Fulton" version of a military flashlight. The flashlight is schematically shown in FIG. 3, and is comprised of a housing 70 in which batteries 76 (only one of which is shown) are contained. The housing 70 has a removable bottom enclosure 74 to facilitate insertion of the batteries 76 into the housing 70. A switch 31b is mounted on the housing for making and breaking the circuit between the power supply (batteries) and the circuit means which converts the low D.C. voltage from the power supply into a high A.C. voltage for energiding the electroluminescent panel 22b.

The module disclosed in FIG. 3 contains a polished acrylic light transmitting rod 12b, such as Lucite or Plexiglas. The rod 12b has a flanged portion 66 which is adapted to seat on the upper surface of housing 70. The flanged portion 66, and the portion of the outer periphery 14b of the light transmitting rod 12b which is above the flanged portion 66, is provided with a flat black finish, such as acrylic lacquer, to absorb any light which is refracted through the periphery of the rod. The outer periphery 14b which is below the flanged portion 66 is provided with a wrap of an electroluminescent panel 22b which is securely fixed to rod 12b by any suitable means. For example, a tape can be used to secure the panel 22b to the rod 12b, or alternatively, one of the leads of the electroluminescent panel 22b to provide a friction holding force between the rod 12b and the panel 22b. When the module 10b is seated on housing 70, the electroluminescent panel 22b will be positioned within the housing 70. A cap or retaining ring 65 is provided which screws onto the housing 70 thereby removably securing the module to said housing.

In the rearward portion of the light transmitting rod 12b, adjacent the wrap of electroluminescent panel 22b, a diffuse reflecting surface 18b is provided which defines a conical cavity 20b. The reflecting surface 18b, which is machine finished and painted white, converges toward the forward portion of the rod 12b.

A cap 82, made from a suitable material such as Plexiglas, is fastened to the rearward portion of the light transmitting rod 12b by cementing with any suitable acrylic gum base cement. The cap 82 in conjunction with the conical cavity 20b define an enclosure in which the circuit means for converting low voltage D.C. to high voltage A.C. is mounted. A metal shell 58, such as brass, is attached to the cup 82 by any suitable means, such as a press-fit, to provide a contact surface for connection to the negative terminal of the power supply through contact 72. A hollow rivet 62 and metal washer 63 are provided in cup 82 for providing electrical contact with the positive terminal of the power supply.

The circuit means is electrically connected to the power supply by soldering lead 86 to metal ring 58, and lead 88 to rivet 62. Suitable leads (not shown) connect the circuit means to the electroluminescent panel 22b to complete the circuit. Switch 31b is actuated to make and break the circuit when desired.

The module 10b is further provided with a lens 50 which has a polished lens face 52 for focusing the light transmitted through said lens face on an object to be viewed. The lens 50 has a polished inside face 54, and a cavity defined by leg portion 78 for receiving the forward portion of the light transmitting rod 12b. O-rings 60 are provided between the forward portion of the light transmitting rod 12b, and the leg portion 78 of the lens 50 to create a friction fit between said rod 12b and said lens 50. The lens 50 is rotatable with respect to said rod 12b. Polarizing filters 64 are secured to the inside face 54 of lens 50, and to the forward face 16b of rod 12b, by a clear epoxy cement. Therefore, rotation of the lens 50 relative to the rod 12b will cause one polarizing filter to be rotated with respect to the other polarizing filter to vary the intensity of the radiant energy which is emitted through the lens face 52. The outside surface 56 of the lens 50 is provided with a black, flat finish coating such as dull black acrylic lacquer to absorb any light refracted through said outside surface.

This lighting unit 10b has a power consumptiton of approximately .09 watt (.030 amp at 3 volts), and can be utilized to read scales and type in total darkness without being detectable at a distance of 15 feet from said unit.

The device described above is intended to be illustrative only, it being understood that many modifications can be made within the purview of this invention. For example, although the embodiment disclosed in FIG. 3 utilizes polarizing filters to vary the intensity of radiant energy emission from the lens, one could utilize a variable resistor to control such intensity. The variable resistor could be controlled by a knob mounted on the housing 70 of the flashlight or could be controlled by rotatiton of lens 50 with respect to rod 12b by mounting the variable resistor in a manner similar to that disclosed in FIG. 4, which will be discussed infra.

FIG. 3A

Another arrangement for varying the intensity of light emission through lens face 52 is shown in FIG. 3A. The light transmitting rod 12c has a blazed surface 16c at its forward end which is comprised of blaze segments 85. The lens 50a has a blazed surface 54a comprised of blaze segments 83, which face blaze segments 85. When lens 50a is rotated such that the blaze segments 83 are parallel to blaze segments 85, maximum intensity radiant energy emission will occur through the polished lens face of lens 50a. As lens 50a is rotated with respect to light transmitting rod 12c the parallel relationship between blaze segments 83 and 85 will gradually be destroyed, and according to well known principles of refraction, lens light rays will be emitted through the polished lens face of lens 50a and more light rays will strike the outside surface 56a of the lens and be absorbed by the coating around said surface 56a.

A fourth embodiment of the invention, in the form of a miniature flashlight approximately 5½ to 6 inches long, is shown in FIG. 4. This device has a head assembly and a housing assembly. The housing assembly is comprised of a housing 70a made of a high impact thermoplastic material. A bottom enclosure 106 is screwed into the base of the housing 70a, and in the preferred embodiment, has a battery 102 integral with said enclosure. The battery is a 4-cell mercury battery with a 4.8 volt output. The battery is connected to the circuit means through variable resistor-switch assembly 98. The housing 70a of the assembly is firmly affixed to a thermoplastic mounting disc 100 by any suitable method, such as solvent cementing techniques or ultrasonic bonding techniques. The disc 100 has an opening to allow wiping brush 114 to pass therethrough.

The variable resistor-switch assembly 98 is of a standard construction having a wiping contact fixed to an internally threaded hollow shaft which is rotatably mounted in the assembly. Fixed to said threaded shaft, below said wiping contact, is a cam having a high portion for biasing normally closed switch contact elements to their open position.

The housing assembly is comprised of the housing 70a, the enclosure 106, the battery 102, the circuit means, the variable resistor-switch assembly 98, and the acrylic mounting disc 100.

The device further includes a head assembly comprised of a polished acrylic light transmitting rod 12d, such as Lucite or Plexiglas. The rod 12d has a forward face 16d. The rearward portion of said rod 12d is comprised of a diffuse reflecting surface 18c which converges toward the forward potrion of rod 12d and defines a conical cavity 20c. An elongated opening 112 provides a through passage from the forward face 16d of the rod 12d to the conical cavity 20c. The function of this opening will be described infra.

An electroluminescent panel 22c, having the same construction as defined with respect to the device disclosed in FIG. 1 is wrapped around the light transmitting rod 12d in the same manner as in the other devices of this invention.

Connected to the rearward portion of the light transmitting rod 12d, and enclosing the conical cavity 20c, is a disc 94 made from a conductive material, such as brass. The disc 94 is fastened to rod 12d by suitable attaching means such as screws 97. A polished acrylic plug 92 is provided for plugging the opening 112. The plug 92 is provided with screw threads for mating with screw threads defining the opening 112 adjacent the forward face 16d, to provide positive securement means between said plug and said light transmitting rod. A metal cyclindrical ring 90, such as brass, is provided around the outer periphery 14c of the light transmitting rod 12d with a friction fit. The ring 90 provides electrical contact with one conductive layer of the electroluminescent panel 22c, and also provides a mechanical connection for aiding in holding the electroluminescent panel adjacent the reduced portion 21c of the outer periphery 14c of the light transmitting rod 12d. The metal ring 90 also acts as a shield to prevent light from escaping through the periphery of the light transmitting rod. The ring 90 extends below the rearward portion of the light transmitting rod and rides on mounting disc 100 to aid in stabilizing the head assembly with respect to the housing assembly.

The head assembly is attached to the housing assembly in the following manner. Plug 92 is removed from the rod 12d to provide access through opening 112. A tool is inserted into and through said opening to both electrically and mechanically connect the internally threaded shaft of the variable resistor-switch assembly 98 to the disc 94 by a screw member 96. A lead 108 electrically connects the transparent conductive layer of the electroluminescent panel 22c to the metal disc 94. In this manner, electrical connection is made between the sliding contact of the variable resistor switch assembly 98 and the electroluminescent panel 22c.

FIG. 5

The operation of this device will be better understood by considering the block diagram in FIG. 5 in conjunction with the device disclosed in FIG. 4. Rotation of the head assembly with respect to the housing assembly causes rotation of the disc 94, the screw 96, and the threaded shaft of the variable resistor switch assembly. Rotation of the threaded shaft causes the high portion of the cam to rotate out of biasing relationship with respect to the switch contacts, thus causing the switch contacts to close and complete the circuit between the battery 76a, and the circuit means.

The circuit means consists of a converter, for converting the D.C. low voltage output from the battery to A.C. low voltage, and an amplifier for amplifying the voltage output from the converter.

The high voltage output from the amplifier is applied to the two conductive layers of the electroluminescent panel 22c in the following manner. One output from the amplifier is connected to a wiping brush 114 which rides on metal ring 90. The ring 90 makes electrical contact with the outer conductive layer of the electroluminescent panel 22c. A second output from the amplifier is connected to the variable resistor of the variable resistor-switch assembly 98. The sliding contact of the variable resistor is electrically connected to the transparent conductive layer of the electroluminescent panel 22c through the threaded shaft of said sliding contact, the screw 96, the metal disc 94, and the lead 108 which is soldered to disc 94.

Thus, once the switch is closed, the electroluminescent panel 22c is energized and the phosphor luminesces. The radiant energy emitted from the electroluminescent panel is reflected through forward face 16d in the same manner as described with respect to the unit of FIG. 1. Continued rotation of the head assembly with respect to the housing assembly will cause the sliding contact of the variable resistor to reduce the resistance in the circuit and thereby increase the intensity of the light emitted through the forward face of the light transmitting rod 12d. Rotation in the opposite direction will gradually decrease the brightness and ultimately open the switch between the battery and the circuit means and thereby deenergize the electroluminescent panel.

Many modifications can be made within the purview of this invention. For example, a variable resistor need not necessarily be used with this device. The variable resistor-switch assembly can be replaced by a simple switch assembly which can be mounted in the same manner as the variable resistor-switch assembly 98. In such a device, initial rotation of the head assembly with respect to the housing assembly will turn the unit "on" but there will be no control over the intensity of the radiant energy emitted through the forward face 16d of the light transmitting rod 12d.

Also, the cylindrical ring 90 can be covered with a plastic material to prevent direct handling of the ring 90 which forms part of the circuit for energizing the electroluminescent panel. This may be necessary because of the effect that body capacitance may have on the operation of high impedance devices such as those discolsed in this application.

Also, the ring need not extend the whole length of the light transmitting rod, but can be of a length sufficient to contact only the electroluminescent panel 22c. When such an ararngement is utilized a black, flat finish covering can be provided around the outer periphery 14c of the rod 12d to act as a shield for the visible light which is refracted through said periphery. Alternatively, the ring can be dispensed with completely, and a lead wire can be utilized to directly connect the electroluminescent panel to the amplifier of the circuit means.

Also, a variable resistor-switch assembly, or a switch assembly alone, can be mounted in the base of housing 70b, and controlled by rotation of bottom enclosure 106, with respect to the housing 70b. In such an arrangement the battery 102 would be separate from the bottom enclosure 106.

Also a retaining ring can be provided around the device in the area where the head assembly and the housing assembly are attached to provide more rigidity to the unit, and reduce the possibility of mechanical disengagement between the assemblies as a result of rough handling of the unit.

The above description is intended to be illustrated of the preferred embodiments of electroluminescent lighting units, and is not intended as a limitation on the scope of protection to which applicant is entitled. Reference should be had to the claims which follow which define the scope of protection to which applicant is entitled:

I claim:

1. A lighting unit comprising a light transmitting rod having an outer periphery, a forward portion with a light emitting surface, and a rearward portion with a reflecting surface means for reflecting light emitted from a light source from said rearward portion to said forward portion and through said light emitting surface, a light source comprising an electroluminescent panel adjacent said reflecting surface means of said light transmitting rod, and shielding means around the periphery of said rod for preventing visible light emission from said periphery, said rod having a substantially U-shaped portion separating said rearward portion from said forward portion, and having means for spacing at least a substantial portion of said shield from at least the U-shaped portion of said rod, said spacing means comprising a plastic screen positioned about the U-shaped portion of said rod.

2. A lighting unit comprising a light transmitting rod having an outer periphery, a forward portion with a light emitting surface, and a rearward portion with a reflecting surface means for reflecting light emitted from a light source from said rearward portion to said forward portion and through said light emitting surface, a light source comprising an electroluminescent panel adjacent said reflecting surface means of said light transmitting rod, said lighting unit being in the form of a module adapted to be utilized in a flashlight which has a housing with a power supply therein, the rearward portion of said light transmitting rod having contact means for making electrical contact with positive and negative terminals of said power supply, said reflecting surface means including a conical surface in the rearward portion of said rod defining a conical cavity which is enclosed by said contact means, and circuit means within said enclosed cavity for converting low D.C. voltage from said power supply to high A.C. voltage for energizing said electroluminescent panel.

3. The lighting unit of claim 2 wherein said electroluminescent panel is positioned about the outer periphery of said light transmitting rod.

4. A lighting unit comprising a light transmitting rod having an outer periphery, a forward portion with a light emitting surface, and a rearward portion with a reflecting surface means for reflecting light emitted from a light source from said rearward portion to said forward portion and through said light emitting surface, a light source comprising an electroluminescent panel adjacent said reflecting surface means of said light transmitting rod, said lighting unit being in the form of a module adapted to be utilized in a flashlight which has a housing with a power supply therein, the rearward portion of said light transmitting rod having contact means for making electrical contact with positive and negative terminals of said power supply, and a lens mounted on said rod and having a surface adjacent the light emitting surface of said rod, said reflecting surface means including a conical surface in the rearward portion of said rod defining a conical cavity which is enclosed by said contact means, and circuit means within said enclosed cavity for converting low D.C. voltage from said power supply to high A.C. voltage for energizing said electroluminescent panel.

5. The lighting unit of claim 4 wherein said electroluminescent panel is positioned about the outer periphery of said light transmitting rod.

6. A lighting unit comprised of a head assembly and a housing assembly; said head assembly comprising a light transmitting rod having an outer periphery, a forward portion comprised of a light emitting surface, and a rearward portion comprised of a reflecting surface means for reflecting light emitted from a light source from said rearward portion to said forward portion and through said light emitting surface, and a light source comprising an electroluminescent panel adjacent said light transmitting rod; said housing assembly comprising a housing, a power supply and circuit means for energizing said electroluminescent panel positioned within said housing, and connection means for mechanically connecting said housing assembly to said head assembly and electrically connecting said circuit means to said electroluminescent panel, said head assembly being rotatably mounted with respect to said housing assembly, said connection means including a switch means for causing the power supply to energize the electroluminescent panel through the circuit means upon rotation of said head assembly relative to said housing assembly in one direction, and for deenergizing the electroluminescent panel upon rotation of said head assembly relative to said housing assembly in the other direction.

7. The lighting unit of claim 6 wherein said connection means also includes variable resistor means for varying the intensity of light emission through said emitting surface of the light transmitting upon rotation of said head assembly relative to said housing assembly after said electroluminescent panel is energized.

References Cited

UNITED STATES PATENTS

| | | | |
|---|---|---|---|
| 1,158,600 | 11/1915 | Wappler | 240—10.6 |
| 1,965,865 | 7/1934 | Thompson. | |
| 2,314,096 | 3/1943 | Leverenz | 240—2.25 |
| 2,538,475 | 1/1951 | Skrastin. | |
| 2,705,318 | 3/1955 | Hallerberg | 240—9.5 |
| 2,831,453 | 4/1958 | Hardesty. | |
| 2,975,318 | 3/1961 | Nicoll. | |
| 3,083,317 | 3/1963 | Fish et al. | |
| 3,046,432 | 7/1962 | Nehrich. | |

NORTON ANSHER, Primary Examiner

D. J. CLEMENT, Assistant Examiner

U.S. Cl. X.R.

240—1, 225, 9.5